United States Patent
Moorman (10) Patent No.: US 8,464,851 B2
(45) Date of Patent: Jun. 18, 2013

(54) ELECTRO-HYDRAULIC CONTROL SYSTEM FOR AN AUTOMATIC TRANSMISSION

(75) Inventor: Steven P. Moorman, Dexter, MI (US)

(73) Assignee: GM Global Technology Operations LLC, Detroit, MI (US)

(*) Notice: Subject to any disclaimer, the term of this patent is extended or adjusted under 35 U.S.C. 154(b) by 168 days.

(21) Appl. No.: 13/079,108

(22) Filed: Apr. 4, 2011

(65) Prior Publication Data

US 2012/0247902 A1  Oct. 4, 2012

(51) Int. Cl.
*F16H 61/14* (2006.01)

(52) U.S. Cl.
USPC .......................................... 192/3.58; 192/3.3

(58) Field of Classification Search
None
See application file for complete search history.

(56) References Cited

U.S. PATENT DOCUMENTS

| | | | | |
|---|---|---|---|---|
| 4,572,338 A * | 2/1986 | Miki | ............................. | 192/3.29 |
| 5,010,991 A * | 4/1991 | Tsukamoto et al. | ........... | 192/3.3 |
| 5,016,175 A * | 5/1991 | Baltusis et al. | .................. | 701/58 |
| 5,722,519 A * | 3/1998 | Kirchhoffer et al. | .......... | 192/3.3 |
| 6,470,763 B2 * | 10/2002 | Ohashi et al. | .................... | 74/335 |
| 7,163,481 B2 * | 1/2007 | Takagi et al. | ................. | 475/101 |

* cited by examiner

*Primary Examiner* — David D Le
*Assistant Examiner* — Mark Manley (57) ABSTRACT

An electro-hydraulic control system for a multiple speed automatic motor vehicle transmission includes main and auxiliary hydraulic pumps, a line pressure regulator, a lubrication pressure regulator, a lubrication override control valve and a torque converter control valve which is controlled by a variable force solenoid (VFS). Driver commands are provided to the system through a manual logic or spool valve which functions in conjunction with a spool or logic default valve and a default solenoid. Five solenoid valves receive various flows of hydraulic fluid and supply them to hydraulic actuators that engage and disengage four friction clutches and a selectable one-way clutch.

20 Claims, 5 Drawing Sheets

ELECTRO-HYDRAULIC CONTROL SYSTEM FOR AN AUTOMATIC TRANSMISSION

FIELD

The present disclosure relates to an electro-hydraulic control system for an automatic transmission and more particularly to an electro-hydraulic control system for a multiple speed automatic motor vehicle transmission.

BACKGROUND

The statements in this section merely provide background information related to the present disclosure and may or may not constitute prior art.

Two control system types have been developed for multiple speed automatic transmissions for motor vehicles and dominate this field. A first type utilizes pressurized hydraulic fluid (transmission oil) provided to a control valve body having a plurality of multi-port spool valves which direct such fluid to a plurality of hydraulic actuators which control clutches and brakes associated with various elements of a plurality of planetary gear assemblies. Such a transmission may be essentially self-contained as most upshift and downshift decisions are made by the valves in the control valve body.

A second type of control system, more recently developed, utilizes solenoid valves and multiple port spool or logic valves to direct pressurized hydraulic (transmission) fluid to a plurality of actuators associated with synchronizer clutches and one or two drive gears. Activation of a solenoid valve when the spool or logic valves are appropriately positioned, provides hydraulic fluid which translates an actuator and engages a desired gear and speed ratio. This type of control system is particularly suitable for use with dual clutch transmissions (DOT's).

In the past, both of these control systems typically are optimized for certain performance or operational features such as fuel economy or exceedingly smooth shifts. The present hydraulic control system provides numerous features previously not found in a single control system and is optimized for many of them.

SUMMARY

The present invention provides a versatile and energy efficient electro-hydraulic control system for a multiple speed automatic motor vehicle transmission. The transmission includes a torque converter, four planetary gear assemblies and five clutches, one of which is a selectable one-way (overrunning) type, which provide eight forward speeds or gear ratios and reverse. The control system includes main (mechanical) and auxiliary (electric) hydraulic pumps, a feed limit control valve, a line pressure regulator, a lubrication pressure regulator, a lubrication override control valve, and a torque converter control valve which is controlled by a variable force solenoid (VFS) valve. Driver commands are provided to the system through a manual logic or spool valve which functions in conjunction with a spool or logic default valve which, in turn, is controlled by a default solenoid valve. Five solenoid valves receive various flows of hydraulic fluid and supply them to hydraulic actuators that engage and disengage the four friction clutches and the selectable one-way clutch.

The control system of the present invention provides, among other features, fast clutch response, reduced transmission spin losses, improved fuel economy, robust failure mode protection, hill hold, park turbine stall and compatibility with both BAS and P2 hybrid systems.

Thus it is an aspect of the present invention to provide an electro-hydraulic control system for an automatic transmission.

It is a further aspect of the present invention to provide a transmission control system for a transmission having a torque converter, four planetary gear assemblies and five clutches.

It is a still further aspect of the present invention to provide an electro-hydraulic transmission control system having a main and an auxiliary pump.

It is a still further aspect of the present invention to provide an electro-hydraulic transmission control system having a line pressure regulator and a lubrication pressure regulator.

It is a still further aspect of the present invention to provide an electro-hydraulic transmission control system having a torque converter control valve controlled by a variable force solenoid.

It is a still further aspect of the present invention to provide an electro-hydraulic transmission control system having a logic or spool valve which is manually controlled by the driver to input gear selection commands.

It is a still further aspect of the present invention to provide an electro-hydraulic transmission control system having five solenoid valves which receive various flows of hydraulic fluid and supply them to five hydraulic actuators.

It is a still further aspect of the present invention to provide an electro-hydraulic transmission control system having a spool or logic default valve and a default solenoid valve.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
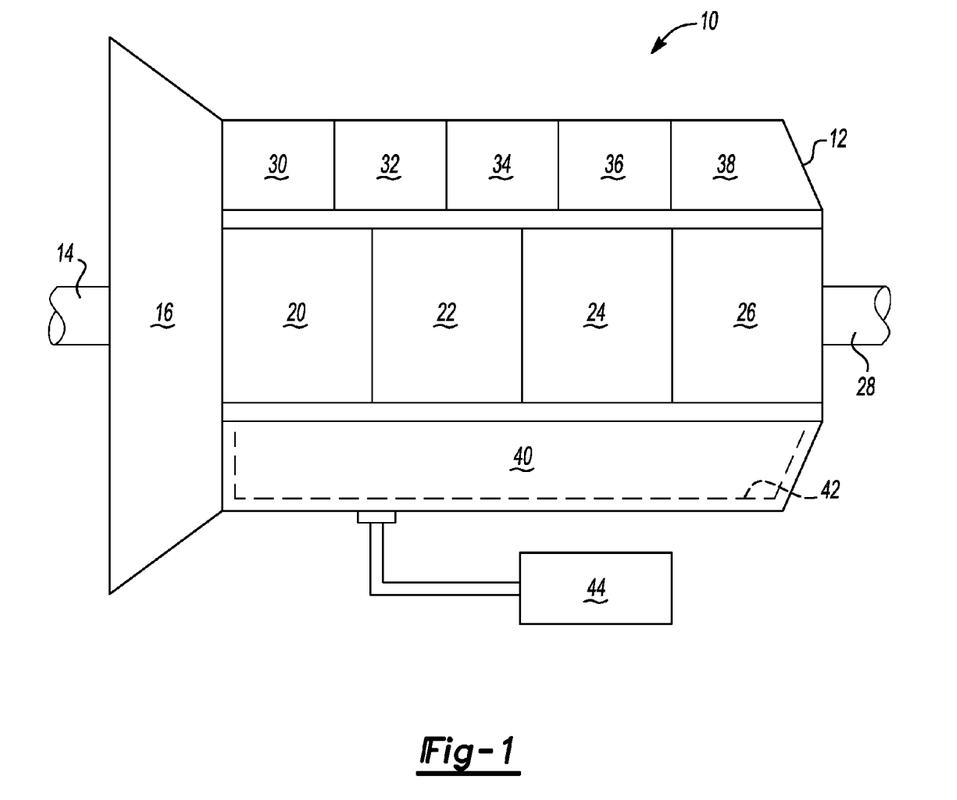
FIG. 1 is a diagrammatic view of a multiple speed automatic transmission for a motor vehicle incorporating the present invention.

With reference to FIG. 1, an automatic motor vehicle transmission incorporating the present invention is illustrated and generally designated by the reference number 10. The automatic transmission 10 includes a typically cast metal housing 12 which receives, surrounds, mounts and protects the various components of the transmission 10. The transmission 10 includes an input shaft 14 which is driven by a prime mover (not illustrated) which may be a gasoline, Diesel, flex fuel or hybrid power plant. The input shaft 14 is coupled to and drives a torque converter 16. The output of the torque converter 16 is provided to a first planetary gear assembly 20. A second planetary gear assembly 22, a third planetary gear assembly 24 and a fourth planetary gear assembly 26 complete the power flow components of the transmission. An output shaft 28 provides drive torque to propeller shaft and/or final drive assembly (both not illustrated).

The automatic transmission 10 also includes a plurality of clutches which selectively connect various elements of the planetary gear assemblies 20, 22, 24 and 26 to other elements or ground them to the housing 12. A first clutch 30 is a multi-plate friction clutch, a second clutch 32 is a selectable one-way (overrunning) clutch, a third clutch 34, is a multi-plate friction clutch, a fourth clutch 36 is a multi-plate friction clutch and a fifth clutch 38 is a multi-plate friction clutch. It should be appreciated that FIG. 1 is provided by way of illustration only and that the actual physical locations of the planetary gear assemblies 20, 22, 24 and 26 and the clutches 30, 32, 34, 36 and 38 as well as their relative locations may be varied and adjusted to suit a particular application or configuration.

The automatic transmission 10 also includes a transmission control system 40 which may be disposed in any convenient location within the housing 12. A hydraulic fluid sump 42 is disposed in a lower portion of the housing 12 and a transmission control module (TCM) 44 which contains various electronic memory, processor and input and output devices may be conveniently located outside or inside the housing 12 of the transmission 10.

Figure 2:
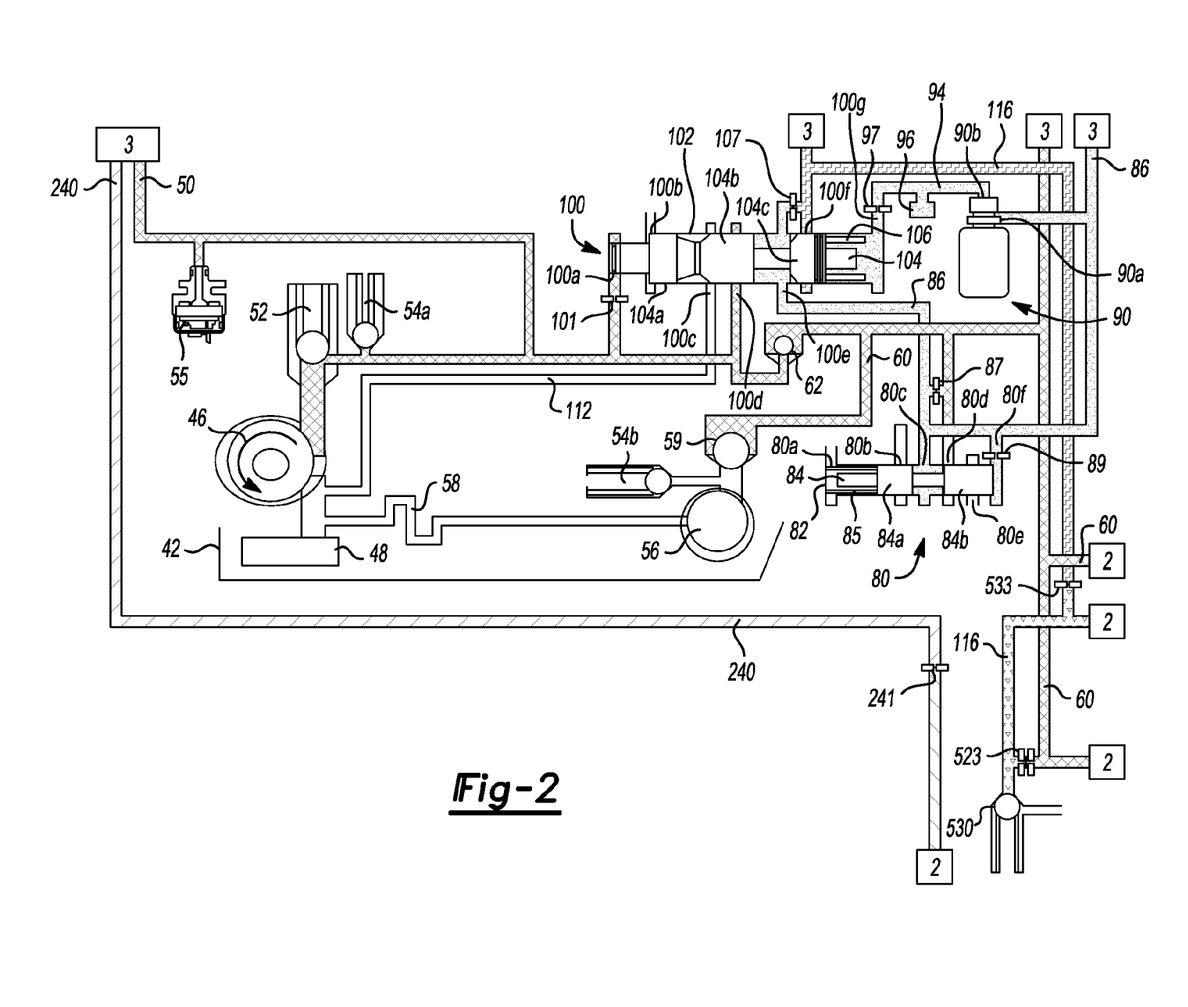
FIG. 2 is a first portion of the components and hydraulic fluid circuit of an electro-hydraulic control system for an automatic transmission according to the present invention.

Referring now to FIG. 2, the transmission control system 40 includes a main hydraulic pump 46 which draws hydraulic fluid (transmission oil) from the front of the sump 42 through a filter 48 and provides pressurized hydraulic fluid to a main supply line 50. A spring biased check valve 52, which is utilized only in P2 hybrid applications, i.e., hybrid engine—transmission configurations wherein an electric motor directly drives the transmission input shaft 14, and a main line pressure blow off valve 54A are in fluid communication with the main supply line 50. A line pressure sensor 55 provides a signal to the transmission control module 44 regarding the instantaneous hydraulic pressure in the main supply line 50. An auxiliary, electric hydraulic pump 56, preferably located in the rear of the sump 42, also draws hydraulic fluid through the filter 48, through an air trap 58 and provides pressurized hydraulic fluid to an auxiliary line pressure blow off valve 54B, a check valve 59 and an auxiliary supply line 60. The main hydraulic pump 46 is the primary source of pressurized hydraulic fluid whereas the auxiliary, electric pump 56 is a secondary source, albeit one which operates when the prime mover is not operating in, for example, a belt alternator starter (BAS) system. In this regard, a check valve 62 which is utilized only in BAS applications, prevents hydraulic fluid flow from the auxiliary supply line 60 to the main supply line 50 but permits flow in the opposite direction.

Figure 3:
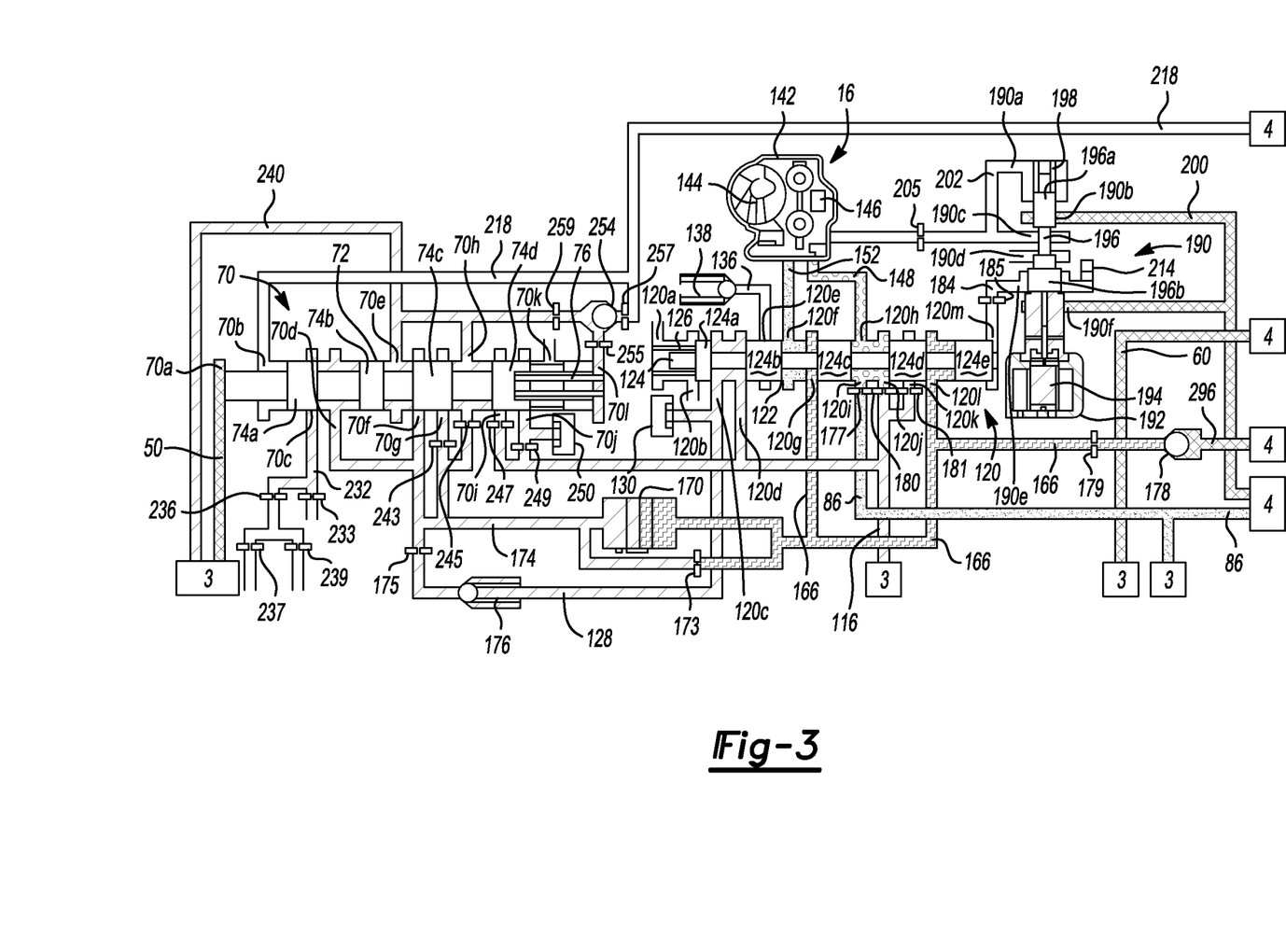
FIG. 3 is a second portion of the components and hydraulic fluid circuit of an electro-hydraulic control system for an automatic transmission according to the present invention.

Referring briefly to FIG. 3, the main supply line 50 communicates with a first control port 70A of a lubrication flow regulator valve 70. The lubrication flow regulator valve 70 is a multiple port spool or logic valve having an elongate housing 72 which receives an axially sliding spool 74 including a plurality of axially spaced apart pistons or lands: a first piston 74A, a second piston 74B, a third piston 74C and a fourth piston 74D. A compression spring 76 biases the spool 74 to the left in FIG. 3.

Returning now to FIG. 2, the auxiliary supply line 60 communicates with an inlet port 80D of a feed limit valve 80. The feed limit valve 80 is a multiple port spool valve having an elongate housing 82 which receives an axially sliding spool 84 having a pair of axially spaced apart pistons or lands: a first piston 84A and a second piston 84B. A compression spring 85 biases the spool 84 to the right in FIG. 2. The elongate housing 82 defines or includes a first exhaust port 80A, a second exhaust port 80B, an outlet port 80C, an inlet or supply port 80D, a third exhaust port 80E and a control port 80F. The exhaust ports 80A, 80B and 80E return hydraulic fluid to the sump 42. A hydraulic line 86 is connected to the outlet port 80C and the auxiliary supply line 60 is connected to the inlet or supply port 80D. A flow controlling orifice 87 communicates between the hydraulic line 86 and the auxiliary supply line 60. The hydraulic line 86 communicates with the control port 80F through a flow controlling orifice 89.

The feed limit valve 80 sets a maximum fluid pressure at its outlet port 80C and in the hydraulic line 86 of, for example, 130 p.s.i. (895 kPa) which is achieved by balancing the force of the compression spring 85 against the force of the hydraulic fluid on the end of the piston 84B.

The hydraulic line 86 also communicates with an inlet port 90A of a normally high, variable bleed solenoid valve 90. An outlet port 90B of the variable bleed solenoid valve 90 communicates through a hydraulic line 94 with a mini-accumulator 96 and a flow controlling orifice 97. The hydraulic line 94 communicates with and terminates at a second control port 100G of a pressure regulator valve 100.

The main supply line 50 communicates with a first control port 100A of the pressure regulator valve 100 though a flow controlling orifice 101. The pressure regulator valve 100 is a multiple port spool valve having an elongate housing 102 which receives an axially sliding spool 104 having three axially spaced apart pistons or lands: a first piston 104A, a second piston 104B and a third piston 104C. A compression spring 106 biases the spool 104 to the left in FIG. 2A. The housing 102 also defines an exhaust port 100B, a bypass port 100C, an inlet or supply port 100D, a pair of aligned ports 100E, an outlet port 100F which communicates with one of the aligned ports 100E through a flow controlling orifice 107, and the second control port 100G.

The exhaust port 100B returns hydraulic fluid to the sump 42. The bypass port 100C communicates through a pressurized bypass line 112 to the input of the main hydraulic pump 46, the main supply line 50 communicates directly with the inlet or supply port 100D and the hydraulic line 86 which is connected to the outlet port 80C of the feed limit valve 80 communicates with the aligned ports 100E and through the flow controlling orifice 107 with the outlet port 100F and a hydraulic line 116. The pressure regulator valve 100 provides regulated hydraulic pressure in the main supply line 50 in response to a force balance on the spool 104 of the force on the face of the piston 104A driving the spool 104 to the right in FIG. 2 and the force on the face of the piston 104C and the force of the compression spring 106 driving the spool 104 to the left.

Referring now to FIG. 3, the control system 40 also includes a converter control valve 120. The converter control valve 120 is a multiple port spool or logic valve having an elongate housing 122 which receives an axially sliding spool 124 including a plurality of axially spaced apart pistons or lands: a first piston 124A, a second piston 124B, a third piston 124C, a fourth piston 124D and a fifth piston 124E. A compression spring 126 biases the spool 124 to the right in FIG. 3. The elongate housing 122 includes and defines a plurality of ports: a first exhaust port 120A, a second exhaust port 120B which both communicate with the sump 42, a first inlet port 120C, a first outlet or supply port 120D, a pressure limiting port 120E, a converter return port 120F, a converter exhaust port 120G, a converter supply port 120H, a first converter inlet port 120I, a second converter inlet port 120J, a third converter inlet port 120K, a cooler supply port 120L and a control port 120M.

The first exhaust port 120A is a relief port and the second exhaust port 120B cooperates with the first piston 124A and opens when the spool 124 moves to the left. Both exhaust ports 120A and 120B communicate with the sump 42. The first inlet port 120C receives hydraulic fluid in a hydraulic line 128. A pressure switch 130 monitors fluid pressure in the line 128 and provides a two state signal to the transmission control module 44 reporting the position of the spool 124 of the converter control valve 120 by indicating whether the fluid pressure in the hydraulic line 128 is above or below a predetermined value. When the spool 124 is to the right in FIG. 3, the pressure switch 130 is open; when the spool 124 is to the left, the switch 130 is closed. The hydraulic line 116 communicates with the first outlet or supply port 120D, the second converter inlet port 120J and the third converter inlet port 120K as well as ports of the lubrication pressure regulator valve 70. The pressure limiting port 120E communicates through a line 136 with a torque converter charge blow-off valve 138. The torque converter charge blow-off valve 138 limits the pressure that can develop or exist in the interior of a torque converter 16. The torque converter charge blow-off valve 138 is preferably set to open at approximately 25 p.s.i. (172 kPa) when the spool 124 is in its left position (locked torque converter) as illustrated in FIG. 3.

The torque converter 16 is a three path, closed torque converter having a housing 142 which contains a torque multiplying fluid coupling 144 and a lock-up clutch 146. A hydraulic supply line 148 communicates between the converter supply port 120H of the converter control valve 120 and the interior of the housing 142 of the torque converter 16 and supplies a flow of hydraulic fluid thereto for cooling the torque converter 16. A hydraulic return line 152 communicates with the converter return port 120F. The converter exhaust port 120G communicates through a hydraulic supply line 166 with an inlet of a hydraulic fluid (transmission oil) cooler 170. The hydraulic line 166 also communicates with the cooler supply port 120L.

The hydraulic fluid cooler 170 is a heat exchanger that transfers heat generated in the transmission 10, particularly the torque converter 16, to the ambient. A flow restricting orifice 173 is disposed in parallel with the fluid cooler 170 and communicates, as does the cooler 170, between the hydraulic supply line 166 and a cooler output or return line 174. A flow restricting orifice 175 and a pressure relief check valve 176 communicate between the cooler relief line 174 and the hydraulic line 128 and allow hydraulic fluid flow from the line 174 to the line 128 when the pressure differential across the check valve 176 exceeds a predetermined value but prevents flow in the opposite direction. A check valve 178 permits hydraulic fluid flow from the hydraulic line 166 through a flow restricting orifice 179 to a hydraulic line 296 but prevents fluid flow in the opposite direction.

Returning to the converter control valve 120, the hydraulic line 86 communicates with the first converter inlet port 120I through a flow restricting orifice 177 and the hydraulic line 116 communicates through another flow restricting orifice 180 with the second converter inlet port 120J and through yet another flow restricting orifice 181 with the third converter inlet port 120K. The control port 120M communicates through a hydraulic line 184 having a flow restricting orifice 185 with a converter control valve port 190E of a normally low, torque converter apply variable force solenoid (VFS) valve 190. The torque converter apply valve 190 is electrically operated and includes a housing 192 containing a solenoid 194 which axially translates a spool 196 having a pair of spaced apart pistons 196A and 196B contained within the housing 192. The housing 192 defines a feedback port 190A, a first supply port 190B, a torque converter outlet port 190C, an exhaust port 190D, a converter control valve port 190E and a second supply port 190F. A compression spring 198 biases the spool 196 toward the solenoid 194.

The first supply port 190B of the torque converter apply valve 190 is selectively provided with pressurized hydraulic fluid in a line 200. The torque converter outlet port 190C communicates with a hydraulic line 202 that includes a flow restricting orifice 205 and terminates in the lock-up clutch 146 of the torque converter 16. The torque converter outlet port 190C also communicates with the feedback port 190A. When the solenoid 194 is energized, the piston 196A translates and controls the hydraulic pressure applied to the lock-up clutch 146 in response to both an electrical signal and pressure at the feedback port 190A. The second supply port 190F of the torque converter apply valve 190 is selectively provided with pressurized hydraulic fluid in the line 200. The converter control valve port 190E communicates with the hydraulic line 184 having both a mini-accumulator 214 and the flow restricting orifice 185 which terminates in the control port 120M of the converter control valve 120. When the solenoid 194 is energized, and hydraulic fluid is being supplied in the line 200, the piston 196B translates and controls the hydraulic pressure applied to the end of the fifth piston 124E and the spool 124 of the converter control valve 120, translating it against the force of the compression spring 126. When the solenoid 194 is de-energized, hydraulic fluid is released through the exhaust port 190D and returns to the sump 42.

The torque converter apply valve 190 has essentially two operating states: a first, quiescent state, in which the clutch 146 of the torque converter 16 is not engaged and the fluid coupling 144 is allowed to slip, generating heat and a second, energized state in which the clutch 146 of the torque converter 16 is engaged and the fluid coupling 144 is locked, thereby generating little heat. In the first state, the torque converter apply valve 190 commands or allows the spool 124 of the converter control valve 120 to the right, as illustrated in FIG. 3, to provide maximum cooling hydraulic fluid flow to the torque converter 16. In the second, energized state, the output of the torque converter apply valve 190 commands the spool 124 of the converter control valve 120 to the left to provide a predetermined minimum cooling hydraulic fluid flow to the torque converter 16.

Returning now to the lubrication flow regulator valve 70, the elongate housing 72 includes or defines a plurality of ports including the first control port 70A, a lubrication override port 70B, a first exhaust port 70C, a first override default port 70D, a first regulated lubrication port 70E, a first cooler return port 70F, a second cooler return port 70G, a third cooler return and regulated lubrication port 70H, a first converter feed limit port 70I, a second converter feed limit port 70J, a second exhaust port 70K and a second control port 70L. As noted above, the first control port 70A receives pressurized hydraulic fluid in the main supply line 50 which provides a force which biases the spool 74 to the right in FIG. 3. The lubrication override port 70B communicates through a lubrication override hydraulic line 218 with a lubrication override enable valve 220 (illustrated in FIG. 4). The first exhaust port 70C communicates through a hydraulic line 232 with a flow restricting orifice 233 and the sump 42. A branch of the hydraulic line 232 is closed off by a selector plate 236 which may be removed if the control system 40 is being utilized with a P2 hybrid configuration, in which case a flow restricting orifice 237 may be utilized to control hydraulic fluid flow to a P2 electric motor (not illustrated) while another flow restricting orifice 239, disposed in parallel, controls flow to the sump 42.

The first override default port 70D communicates with the output of the oil cooler 170 through the line 174, as does the first cooler return port 70F. The first regulated lubrication port 70E is connected to a regulated lubrication hydraulic line 240 which includes a flow restricting orifice 241 (illustrated in FIG. 2), as is the third cooler return and regulated lubrication port 70H. The output or the oil cooler 170 in the line 174 also communicates with the second cooler return port 70G through a flow restricting orifice 243 and through a flow restricting orifice 245 to the third cooler return and regulated lubrication port 70H. The hydraulic line 116 communicates with the first converter feed limit port 70I through a flow restricting orifice 247 and with the second converter feed limit port 70J through a flow restricting orifice 249.

Between the second converter feed limit port 70J and the flow restricting orifice 249 resides a lubrication/pressure regulator valve pressure switch 250 which monitors the hydraulic pressure at this location and provides an on-off or two state signal to the transmission control module 44 indicating whether the sensed hydraulic pressure is above or below a predetermined value. The second exhaust port 70K communicates with the sump 42 and the second control port 70L communicates with a three way check valve 254 through a flow restricting orifice 255. The three way check valve 254 also communicates with the hydraulic line 218 through a flow restricting orifice 257 and with the regulated lubrication hydraulic line 240 through a flow restricting orifice 259.

The lubrication flow regulator valve 70 senses the main supply pressure in the main supply line 50 at the first control port 70A and the higher pressure supplied to the three way check valve 254 in the hydraulic lines 218 and 240 which is supplied to the second control port 70L and, with the bias provided by the compression spring 76, seeks and maintains a balanced position. As illustrated in FIG. 3, the spool 74 is near the right end and the primary hydraulic fluid flow through the lubrication flow regulator valve 70 is from the oil cooler 170 in the line 174, through the port 70H and into the line 240. If the spool 74 moves to the right, additional flow to the line 240 occurs through the ports 70F and 70E. If the spool 74 moves to the left, flow commences between the ports 70D and 70C, port 70G is opened to provide additional lubrication flow and the port 70J is exhausted through the port 70K.

Figure 4:
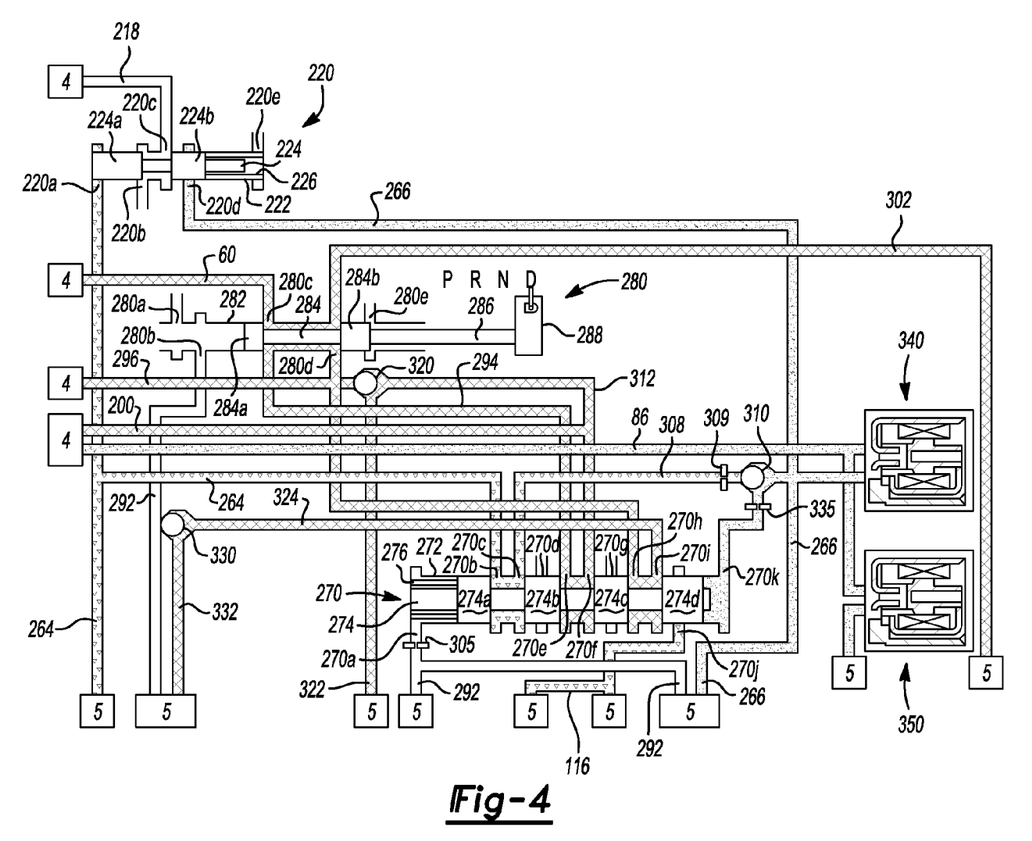
FIG. 4 is a third portion of the components and hydraulic fluid circuit of an electro-hydraulic control system for an automatic transmission according to the present invention.

Referring now to FIG. 4, the lubrication override enable valve 220 is a multiple port spool valve which includes a housing 222 which receives a spool 224 having or defining a first piston 224A and a second piston 224B. A compression spring 226 biases the spool 224 to the left in FIG. 4. The housing 222 includes a control port 220A, a first exhaust port 220B, an outlet port 220C, an inlet port 220D and a second exhaust port 220E. The control port 220A communicates with a port of a three way check valve 262 through a hydraulic line 264 which also communicates with a first inlet port 270B of a spool or logic default valve 270, both illustrated in FIG. 4. The first exhaust port 220B and the second exhaust port 220E communicate with the sump 42. The outlet port 220C communicates through the lubrication override hydraulic line 218 with various components of the lubrication flow regulator valve 70 noted above. The inlet port 220D communicates with a hydraulic line 266.

A manually operated spool valve 280 includes an elongate housing 282 which slidably receives a spool 284 having a first piston 284A axially spaced from a second piston 284B. A shaft 286 extends outside and beyond the housing 282 and includes a selector lever 288 or similar structure that may be moved by the motor vehicle operator into various shift positions such as P (Park), R (Reverse), N (Neutral) and D (Drive). The spool 284 and the selector lever 288 are illustrated in the Drive position in FIG. 4. The housing 282 defines and includes a first exhaust port 280A, a reverse port 280B, a first pair of aligned ports 280C which are in fluid communication, a second pair of aligned ports 280D which are in fluid communication and a second exhaust port 280E. The first exhaust port 280A and the second exhaust port 280E communicate with the sump 42. The reverse port 280B communicates with a reverse hydraulic line 292. The first pair of aligned ports 280C receive pressurized hydraulic fluid from the auxiliary supply line 60 and discharge it to a hydraulic line 294 which communicates with a second inlet port 270E of the spool or logic default valve 270. The second pair of aligned ports 280D receive hydraulic fluid in the hydraulic line 296 and discharge it to a hydraulic line 302. The hydraulic line 296 also communicates with a third inlet port 270H of the spool or logic default valve 270.

The spool or logic default valve 270 includes an elongate housing 272 which defines a plurality of ports: a first control port 270A, a first inlet port 270B, a first outlet port 270C, a first exhaust port 270D, the second inlet port 270E, a second outlet port 270F, a second exhaust port 270G, the third inlet port 270H, a third outlet port 270I, a fourth outlet port 270J and a second control port 270K. The default valve 270 includes a spool 274 which is axially slidable within the housing 272 and includes a plurality of axially spaced apart pistons: a first piston 274A, a second piston 274B, a third piston 274C and a fourth piston 274D. The spool is biased to the right in FIG. 4 by a compression spring 276. The default valve 270 receives hydraulic fluid from the manually operated spool valve 280 as well as two control signals and ensures that certain gear selections cannot be engaged or, under certain circumstances, only certain limited gears can be engaged.

The first control port 270A communicates with the hydraulic line 292 through a flow restricting orifice 305. The first inlet port 270B is connected to the hydraulic line 264. The first outlet port 270C communicates through a hydraulic line 308 having a flow restricting orifice 309 with a three way check valve 310. The exhaust ports 270D and 270G communicate with the sump 42. The second inlet port 270E is connected to the hydraulic line 294, as noted. The second outlet port 270F communicates through a hydraulic line 312 with a three way check valve 320. The check valve 320 also communicates with the hydraulic line 296 and a clutch supply line 322. As noted above, the third inlet port 270H receives hydraulic fluid from the hydraulic line 296 and the third outlet port 270I communicates with a hydraulic line 324 with terminates in a three way check valve 330. The check valve 330 also communicates with the hydraulic line 292 and provides the higher pressure of these two hydraulic lines to a third hydraulic line 332. The fourth outlet port 270J is connected to the hydraulic line 116.

The spool or logic default valve 270 is a two position (two state) device, the position of the spool 274 being dictated by the hydraulic pressures applied to the two control ports 270A and 270K and the forces generated on the faces of the pistons 274A and 274D as well as the biasing force provided by the compression spring 276. The first control port 270A is supplied by the hydraulic line 292 and the second control port 270K is supplied through a flow restricting orifice 335 from the three way check valve 310. The three way check valve 310 is supplied, in turn, through the hydraulic line 266 communicating with an output of a two position default solenoid valve 340. The default solenoid valve 340 is supplied with hydraulic fluid from the hydraulic line 86. When energized, the default solenoid valve 340 supplies hydraulic fluid from the hydraulic line 86 to the various branches of the hydraulic line 266.

In addition to providing redundant control features which provide robust failure modes, the default valve 270 provides a low and high gear, limp home failure mode. When the spool 274 is in the left position illustrated in FIG. 4, which occurs when the transmission 10 is operating in a higher speed range, and a significant electrical or hydraulic failure occurs, a sixth gear default operating mode is achieved by providing hydraulic fluid to and engaging the third clutch 34, the fourth clutch 36 and the fifth clutch 38. If after this occurs and the transmission 10 is placed in Park or Reverse and then back into Drive, or if the failure initially occurs when the transmission is not operating, the spool 274 will translate (or already reside) in the right position. Here, a lower speed, third gear default operating mode will be achieved by providing hydraulic fluid to and engaging the second clutch 32, the third clutch 34 and the fourth clutch 36 (all illustrated in FIG. 1).

Hydraulic fluid from the hydraulic line 86 is also provided to an inlet of a second clutch solenoid valve 350. The second clutch 32 includes a selectable one-way or overrunning clutch assembly 352, illustrated in FIG. 5. The second clutch solenoid valve 350 is a two position (two state) device. The outlet of the second clutch solenoid valve 350 communicates with an inlet port 360D of a selectable one way clutch enable valve 360.

Figure 5:
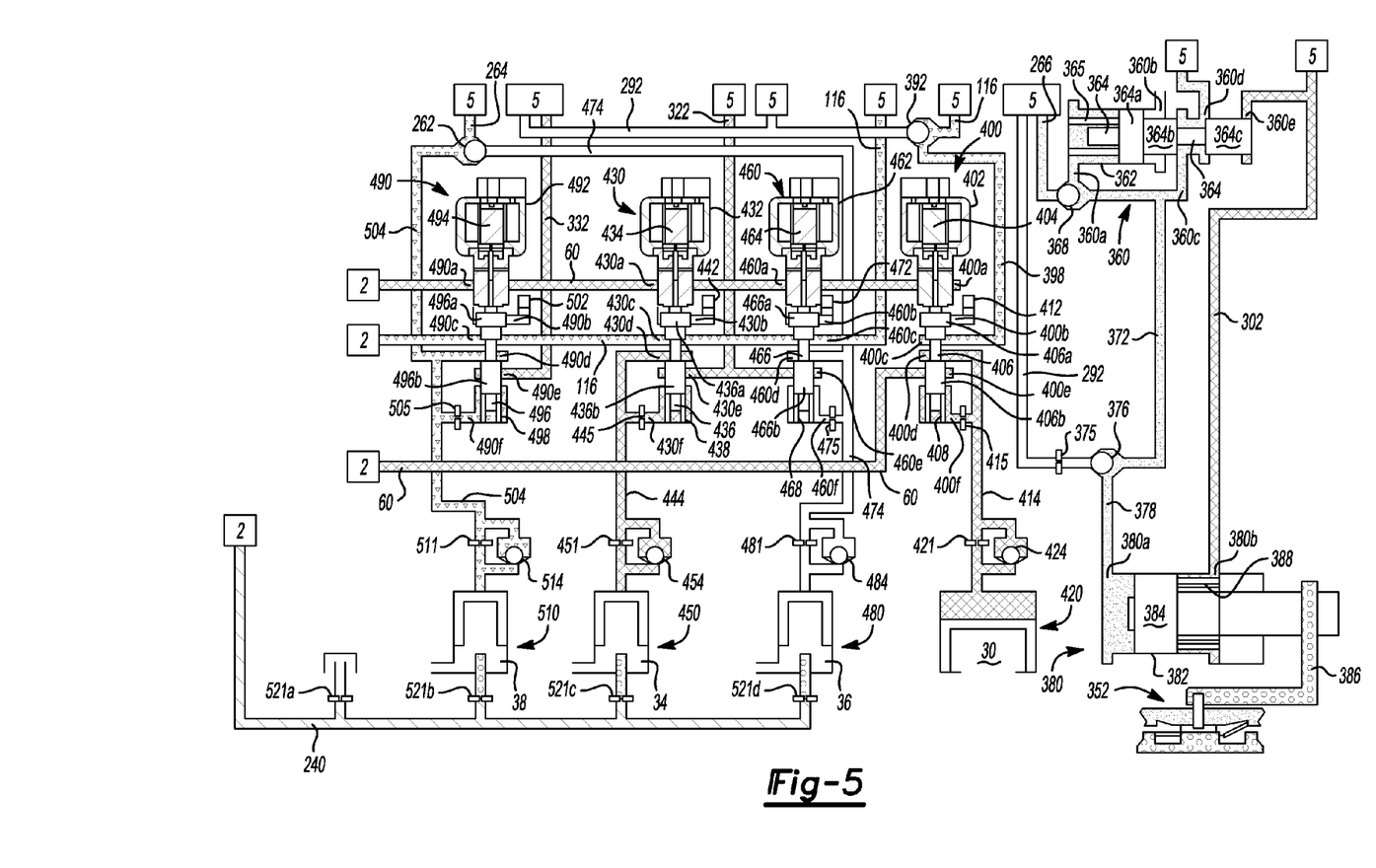
FIG. 5 is a fourth portion of the components and hydraulic fluid circuit of an electro-hydraulic control system for an automatic transmission according to the present invention.

Referring now to FIG. 5, the selectable one way clutch enable valve 360 includes a housing 362 which defines a plurality of ports: a first control port 360A, an exhaust port 360B, an outlet port 360C, the inlet port 360D and a second control port 360E. The housing 362 slidably receives a spool 364 having a first, larger piston 364A adjacent and integrally formed with a second, smaller piston 364B and an axially spaced apart third piston 364C. The spool is biased to the right in FIG. 5 by a compression spring 365. The first control port 360A communicates with a three way check valve 368 which also communicates with the hydraulic line 266 and a hydraulic line 372 communicating with the outlet port 360C. The exhaust port 360B communicates with the sump 42. The second control port 360E receives hydraulic fluid from the hydraulic line 302.

The hydraulic line 292 communicates through a flow restricting orifice 375 with a three way check valve 376 which also communicates with the hydraulic line 372. The higher pressure flow in the hydraulic lines 292 and 372 is provided by the three way check valve 376 in a hydraulic line 378 to an inlet port 380A of a hydraulic actuator 380. The hydraulic actuator 380 includes a housing or cylinder 382 and a piston 384 which translates the selectable one-way or overrunning clutch assembly 352 through a linkage 386. A compression spring 388 biases the piston 384 to the left in FIG. 5, to the freewheel position of the selectable one-way clutch assembly 352. The housing or cylinder 382 also includes a second inlet port 380B which is connected to the hydraulic line 302. When the pressure balance on the piston 384 drives it to the right, the selectable one-way clutch assembly 352 is locked; when it moves to the left, the selectable one-way clutch assembly 352 freewheels in one direction.

Turning now to the activation of the various friction clutches 30, 34, 36 and 38, the first clutch 30, a friction clutch, which is activated when the transmission 10 is in first, second, seventh, eighth and reverse gears includes a three way check valve 392 which is supplied by hydraulic fluid from both the lines 292 and the hydraulic line 116 which communicates with the fourth outlet port 270J of the default valve 270. The three way check valve 392 also communicates with a first outlet port 400C of a normally low, variable force solenoid (VFS) valve 400. The normally low, variable force solenoid valve 400 is electrically operated and includes a housing 402 containing a solenoid 404 which axially translates a spool 406 having a pair of spaced apart pistons 406A and 406B contained within the housing 402. A compression spring 408 biases the spool 406 toward the solenoid 404. The housing 402 defines a first inlet port 400A, an accumulator port 400B which communicates with a mini-accumulator 412, the first outlet port 400C, a second outlet or clutch supply port 400D, a second inlet port 400E and a feedback port 400F.

The first inlet port 400A and the second inlet port 400E communicate with the auxiliary supply line 60, the second outlet or clutch supply port 400D communicates with a hydraulic line 414 and, through a flow restricting orifice 415, with the feedback port 400F. The hydraulic line 414 communicates with a first clutch actuator 420 operating on the first friction clutch 30 through a parallel flow restricting orifice 421 and a check valve 424.

The third clutch 34, also a friction clutch, is activated when the transmission 10 is in first, third, fifth, sixth and seventh gears and the hydraulic circuit includes a normally high, variable force solenoid valve 430 which is electrically operated and includes a housing 432 containing a solenoid 434 which axially translates a spool 436 having a pair of spaced apart pistons 436A and 436B contained within the housing 432. A compression spring 438 biases the spool 436 toward the solenoid 434. The housing 432 defines a first inlet port 430A, an accumulator port 430B which communicates with a mini-accumulator 442, a first outlet port 430C, a second outlet or clutch supply port 430D, a second inlet port 430E and a feedback port 430F.

The first inlet port 430A communicates with the auxiliary supply line 60 and the first outlet port 430C communicates with the hydraulic line 116. The second inlet port 430E communicates with the hydraulic line 322. The second outlet or clutch supply port 430D communicates with a hydraulic line 444 and, through a flow restricting orifice 445, with the feedback port 430F. The hydraulic line 444 communicates with a third clutch actuator 450 operating on the third clutch 34 through a parallel flow restricting orifice 451 and a check valve 454.

The fourth clutch 36, also a friction clutch, is activated when the transmission 10 is in second, third, fourth, sixth and eighth gears and the hydraulic circuit includes a normally high, variable force solenoid valve 460 which is electrically operated and includes a housing 462 containing a solenoid 464 which axially translates a spool 466 having a pair of spaced apart pistons 466A and 466B contained within the housing 462. A compression spring 468 biases the spool 466 toward the solenoid 464. The housing 462 defines a first inlet port 460A, an accumulator port 460B which communicates with a mini-accumulator 472, a first outlet port 460C, a second outlet or clutch supply port 460D, a second inlet port 460E and a feedback port 460F.

The first inlet port 460A communicates with the auxiliary supply line 60 and the first outlet port 460C communicates with the hydraulic line 116. The second inlet port 460E communicates with the hydraulic line 322. The second outlet or clutch supply port 460D communicates with a hydraulic line 474 and, through a flow restricting orifice 475, with the feedback port 460F. The hydraulic line 474 communicates with one port of the three way check valve 262. The hydraulic line 474 communicates with a fourth clutch actuator 480 operating on the fourth clutch 34 through a parallel flow restricting orifice 481 and a check valve 484.

The fifth clutch 38, a friction clutch, is activated when the transmission 10 is in fourth, fifth, sixth, seventh, eighth and reverse gears and the hydraulic circuit includes a normally high, variable force solenoid valve 490 which is electrically operated and includes a housing 492 containing a solenoid 494 which axially translates a spool 496 having a pair of spaced apart pistons 496A and 496B contained within the housing 492. A compression spring 498 biases the spool 496 toward the solenoid 494. The housing 492 defines a first inlet port 490A, an accumulator port 490B which communicates with a mini-accumulator 502, a first outlet port 490C, a second outlet or clutch supply port 490D, a second inlet port 490E and a feedback port 490F.

The first inlet port 490A communicates with the auxiliary supply line 60 and the first outlet port 490C communicates with the hydraulic line 116. The second inlet port 490E communicates with the hydraulic line 332. The second outlet or clutch supply port 490D communicates with a hydraulic line 504 which also communicates with the three way check valve 262. The hydraulic line 504 also communicates with the feedback port 490F through a flow restricting orifice 505 and with a fourth clutch actuator 510 operating on the fifth clutch 38 through a parallel flow restricting orifice 511 and a check valve 514. The direct connections between the outputs of the variable force solenoid valves 400, 430, 460 and 490 and the clutch actuators 420, 450, 480 and 510, respectively, provide rapid and controlled actuation which significantly contribute to the overall performance of the automatic transmission 10.

The hydraulic lubrication line 240 which communicates with the first regulated lubrication port 70E of the lubrication flow regulator valve 70 (illustrated in FIG. 3) includes a flow controlling orifice 517 and a plurality of parallel orifices 521A, 521B, 521C and 521D which individually control lubricating hydraulic fluid flow to the front of the transmission 10, the fifth clutch 38, the third clutch 34 and the fourth clutch 36.

Returning briefly to FIG. 2, between the auxiliary supply line 60 and the hydraulic line 116 resides a flow controlling orifice 523. Adjacent the flow controlling orifice 523 in the hydraulic line 116 is an exhaust BF blow-off valve 530 which preferably opens at approximately 3 p.s.i. (20 kPa) to relieve excessive pressure in the hydraulic line 116. A flow controlling orifice 533 is disposed in the hydraulic line 116 between the pressure regulator valve 100 and the variable force solenoid valves 400, 430, 460 and 490.

It should be appreciated that reduced transmission spin losses result from the regulated lubrication system of the present invention achieved by the lubrication override control and variable (regulated) hydraulic fluid line pressure. Additionally, the three path torque converter 16 also improves fuel economy. The direct electrical control of the variable feed solenoid valves 400, 430, 460 and 490 facilitates the park turbine stall feature which may be commanded in Park by activating the first clutch 30, the second clutch 32 and the fourth clutch 36. Similarly, a hill hold feature which temporarily locks up the output of the transmission 10 may be achieved by activating four of the clutches.

The description of the invention is merely exemplary in nature and variations that do not depart from the gist of the invention are intended to be within the scope of the invention. Such variations are not to be regarded as a departure from the spirit and scope of the invention.

What is claimed is:

1. A control system for an automatic transmission comprising, in combination,
    a first hydraulic pump having an output,
    a second hydraulic pump having an output,
    a feed limit valve in fluid communication with said output of said second hydraulic pump and having an output,
    a torque converter control valve in fluid communication with said output of said first hydraulic pump and having a control port and an output,
    a torque converter apply solenoid valve having a first output in fluid communication with said control port of said torque converter control valve and a second output adapted to engage a lockup clutch of a torque converter,
    a lubrication flow regulator valve having a first control port in fluid communication with said output of said first hydraulic pump and a second control port,
    an oil cooler operably disposed between an outlet port of said torque converter control valve and an inlet port of said lubrication flow regulator valve,
    a lubrication override enable valve having an outlet in fluid communication with said second control port of said lubrication flow regulator valve,
    a manually operated spool valve having a first output enabling reverse and a second output enabling forward gears of such transmission,
    a default control valve having inlet ports in fluid communication with said second output of said manually operated spool valve, a first default valve control port in fluid communication with said first output of said manually operated valve and a second default valve control port,
    a default solenoid valve having an output in fluid communication with said second default valve control port of said default control valve, and
    a plurality of solenoid valves, each of said solenoid valves having an inlet in fluid communication with said output of said second hydraulic pump and an output in fluid communication with a hydraulic clutch actuator.

2. The control system of claim 1 wherein said manually operated valve includes a gear shift selector moveable by a vehicle operator and said default control valve is a two position valve.

3. The control system of claim 1 further including a clutch solenoid valve having an output, a clutch enable valve having an inlet in fluid communication with said output of said clutch solenoid valve, an outlet and a control port in fluid communication with said output of said default solenoid and said output of said clutch enable valve through a three way check valve, and a double acting hydraulic piston and cylinder assembly having a first inlet in fluid communication with said output of said clutch enable valve and said first default valve control port through a three way check valve.

4. The control system of claim 3 further including a selectable one-way clutch acted upon by said double acting hydraulic piston and cylinder assembly.

5. The control system of claim 1 further including a variable bleed solenoid valve having an output in fluid communication with a control port of said pressure regulator valve.

6. The control system of claim 1 wherein second hydraulic pump is electrically driven.

7. The control system of claim 1 further including a hydraulic line from a port of said lubrication flow regulator valve for providing hydraulic fluid to a plurality of clutches.

8. An electro-hydraulic control system for an automatic transmission comprising, in combination, a source of pressurized hydraulic fluid, a feed limit valve in fluid communication with said source of hydraulic fluid and having an output, a torque converter control valve in fluid communication with said source of pressurized hydraulic fluid and having a control port and an output, a torque converter apply solenoid valve having a first output in fluid communication with said control port of said torque converter control valve and a second output adapted to engage a lockup clutch of a torque converter, a lubrication flow regulator valve having a first control port in fluid communication with said source of hydraulic fluid and a second control port, a lubrication override enable valve having an outlet in fluid communication with said second control port of said lubrication flow regulator valve, a manually operated valve having a first output enabling reverse and a second output enabling forward gears of such transmission, a default control valve having inlet ports in fluid communication with said second output of said manually operated spool valve, a first default valve control port in fluid communication with said first output of said manually operated valve and a second default valve control port, a default solenoid valve having an output in fluid communication with said second default valve control port, a clutch solenoid valve having an output, a clutch enable valve having an inlet in fluid communication with said output of said clutch solenoid valve, an outlet and a control port in fluid communication with said output of said default solenoid and said output of said clutch enable valve through a three way check valve, a double acting hydraulic piston and cylinder assembly having a first inlet in fluid communication with said output of said clutch enable valve and said first default valve control port through a three way check valve, and a plurality of solenoid valves, each of said solenoid valves having an inlet in fluid communication with said source of hydraulic fluid and an output in fluid communication with a hydraulic clutch actuator.

9. The electro-hydraulic control system for an automatic transmission of claim 8 wherein said source of hydraulic fluid includes a first mechanically driven pump and a second electrically driven pump.

10. The electro-hydraulic control system for an automatic transmission of claim 8 wherein said default control valve is a two position valve.

11. The electro-hydraulic control system for an automatic transmission of claim 8 further including a selectable one-way clutch acted upon by said double acting hydraulic piston and cylinder assembly.

12. The electro-hydraulic control system for an automatic transmission of claim 8 further including a variable bleed solenoid valve having an output in fluid communication with a control port of said pressure regulator valve.

13. The electro-hydraulic control system for an automatic transmission of claim 8 further including a sump for receiving and storing hydraulic fluid.

14. The electro-hydraulic control system for an automatic transmission of claim 8 further including a hydraulic fluid cooler disposed in fluid communication between an outlet of said torque converter control valve and an inlet of said lubrication flow regulator valve.

15. An electro-hydraulic control system for an automatic transmission comprising, in combination, a source of pressurized hydraulic fluid, a feed limit valve in fluid communication with said source of hydraulic fluid and having an output, a torque converter control valve in fluid communication with said source of hydraulic fluid and having a control port and an output, a torque converter apply solenoid valve having a first output in fluid communication with said control port of said torque converter control valve and a second output adapted to engage a lockup clutch of a torque converter, a lubrication flow regulator valve having a first control port in fluid communication with said source of hydraulic fluid and a second control port, a lubrication override enable valve having an outlet in fluid communication with said second control port of said lubrication flow regulator valve, a manually operated valve having a first output enabling reverse and a second output enabling forward gears of such transmission, a default control valve having inlet ports in fluid communication with said second output of said manually operated spool valve, a first default valve control port in fluid communication with said first output of said manually operated valve and a second default valve control port, a default solenoid valve having an output in fluid communication with said second control port and a plurality of solenoid valves, each of said solenoid valves having an inlet in fluid communication with said source of hydraulic fluid and an output in fluid communication with a hydraulic clutch actuator.

16. The electro-hydraulic control system for an automatic transmission of claim 15 wherein said source of hydraulic fluid includes a first mechanically driven pump and a second electrically driven pump.

17. The electro-hydraulic control system for an automatic transmission of claim 15 wherein said manually operated valve includes a gear shift selector moveable by a vehicle operator and said default control valve is a two position valve.

18. The electro-hydraulic control system for an automatic transmission of claim 15 further including a pressure regulator valve operably disposed between said source of pressurized hydraulic fluid and said torque converter control valve.

19. The electro-hydraulic control system for an automatic transmission of claim 15 further including a hydraulic fluid cooler disposed in fluid communication between an outlet of said torque converter control valve and an inlet of said lubrication flow regulator valve.

20. The electro-hydraulic control system for an automatic transmission of claim 15 further including a clutch solenoid valve having an output, a clutch enable valve having an inlet in fluid communication with said output of said clutch solenoid valve, an outlet and a control port in fluid communication with said output of said default solenoid and said output of said clutch enable valve through a three way check valve, a double acting hydraulic piston and cylinder assembly having a first inlet in fluid communication with said output of said clutch enable valve and said first default valve control port through a three way check valve and a selectable one-way clutch acted upon by said double acting hydraulic piston and cylinder assembly.

* * * * *